United States Patent
Junginger et al.

(10) Patent No.: US 12,092,731 B2
(45) Date of Patent: Sep. 17, 2024

(54) SYNTHETIC GENERATION OF RADAR AND LIDAR POINT CLOUDS

(71) Applicant: Robert Bosch GmbH, Stuttgart (DE)

(72) Inventors: Andrej Junginger, Stuttgart (DE); Melissa Lober, Gerlingen (DE); Michael Johannes Oechsle, Tuebingen (DE); Thilo Strauss, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 436 days.

(21) Appl. No.: 17/649,877

(22) Filed: Feb. 3, 2022

(65) Prior Publication Data
US 2022/0260706 A1   Aug. 18, 2022

(30) Foreign Application Priority Data
Feb. 12, 2021   (DE) .................. 10 2021 201 331.7

(51) Int. Cl.
| | | |
|---|---|---|
| *G01S 13/90* | (2006.01) | |
| *G01S 7/41* | (2006.01) | |
| *G01S 7/48* | (2006.01) | |
| *G01S 13/86* | (2006.01) | |
| *G01S 13/93* | (2020.01) | |
| *G01S 13/931* | (2020.01) | |
| *G01S 17/93* | (2020.01) | |
| *G01S 17/931* | (2020.01) | |

(52) U.S. Cl.
CPC ............... *G01S 13/90* (2013.01); *G01S 7/411* (2013.01); *G01S 7/4802* (2013.01); *G01S 13/865* (2013.01); *G01S 13/931* (2013.01); *G01S 17/931* (2020.01)

(58) Field of Classification Search
CPC ........ G01S 13/90; G01S 7/411; G01S 7/4802; G01S 13/865; G01S 13/931; G01S 17/931; G01S 17/006; G01S 7/4052; G06F 18/241; G06F 18/214
See application file for complete search history.

(56) References Cited

U.S. PATENT DOCUMENTS

| | | | |
|---|---|---|---|
| 2018/0060725 A1* | 3/2018 | Groh | ................ G06N 3/045 |
| 2020/0111382 A1* | 4/2020 | Sarabandi | ............... G01S 7/415 |
| 2020/0301015 A1 | 9/2020 | Siddiqui et al. | |
| 2020/0301799 A1* | 9/2020 | Manivasagam | ....... G01S 17/006 |

FOREIGN PATENT DOCUMENTS

DE    102017119538 A1    3/2018

\* cited by examiner

*Primary Examiner* — Bernarr E Gregory
*Assistant Examiner* — Juliana Cross
(74) *Attorney, Agent, or Firm* — NORTON ROSE FULBRIGHT US LLP; Gerard A. Messina

(57) ABSTRACT

A method for synthetically generating a point cloud of radar or LIDAR reflections, a reflection indicating at least one location at which radar or LIDAR interrogating radiation has been reflected. In the method, distribution functions which according to a random distribution provide samples in each case for at least one of the variables contained in the radar or LIDAR reflections are provided; synthetic reflections are generated by drawing samples in each case from the distribution functions for variables contained in the radar or LIDAR reflections, one of multiple distribution functions being selected according to at least one selection random distribution in order to draw each sample; the synthetic reflections are combined to form the sought point cloud.

13 Claims, 4 Drawing Sheets

SYNTHETIC GENERATION OF RADAR AND LIDAR POINT CLOUDS

CROSS REFERENCE

The present application claims the benefit under 35 U.S.C. § 119 of German Patent Application No. DE 10 2021 201 331.7 filed on Feb. 12, 2021, which is expressly incorporated herein by reference in its entirety.

FIELD

The present invention relates to the generation of synthetic radar and LIDAR point clouds that may be used, for example, for testing a downstream processing chain or for training classifier networks.

BACKGROUND INFORMATION

Driving assistance systems and systems for the at least semi-automated driving of a vehicle make decisions concerning driving maneuvers, based on observations by sensor of the vehicle surroundings. Such observations by sensor are made not only using cameras, but also increasingly with the aid of radar and LIDAR. Radar and LIDAR measurements provide point clouds of locations at which radar or LIDAR interrogating radiation has been reflected. The point clouds are converted by control units into activation signals for the vehicle, and the vehicle is correspondingly activated.

To ensure that this activation results in a response of the vehicle that complies with traffic regulations under all circumstances, numerous radar or LIDAR point clouds of traffic situations are detected by sensor on test drives. Based on these point clouds, it is checked whether the control unit in each case provides a response of the vehicle that is appropriate for the traffic situation characterized by the point cloud. A large number of vehicle miles must be driven in order to cover the greatest possible variance of test scenarios and their properties, such as objects that are present, their positions, and surrounding conditions.

SUMMARY

Within the scope of the present invention, a method for synthetically generating a point cloud of radar or LIDAR reflections is provided. A radar or LIDAR reflection indicates, in arbitrary coordinates, at least one location at which radar or LIDAR interrogating radiation has been reflected. For example, a distance of the location from the sensor as well as a direction, characterized by two angles, from the sensor to the location may be indicated as coordinates. In addition, the reflection may indicate further arbitrary measured variables that are detected in conjunction with the location, such as a velocity of the reflecting object or a signal strength.

In accordance with an example embodiment of the present invention, distribution functions are provided, which according to a random distribution provide samples in each case for at least one of the variables contained in the radar or LIDAR reflections. Synthetic reflections are generated by drawing samples in each case from the distribution functions for variables contained in the radar or LIDAR reflections. One of multiple distribution functions is selected according to at least one selection random distribution in order to draw each sample.

Distribution functions may in particular indicate, for example, the probability that a certain value is drawn as the next sample, as a function of this value. When a large number of samples is drawn, the distribution of these samples at least approximately corresponds to the distribution function.

In accordance with an example embodiment of the present invention, due to the fact that the synthetic reflections are formed by drawing samples from distribution functions, the stochastic character of the radar and LIDAR measurements is taken into account. Even if the sensor used does not move with respect to the observed setting and this setting is also essentially constant, the reflections in the position fluctuate and create noise. The reflections may even stochastically fluctuate, i.e., appear and then disappear. It is thus to be expected that successive observations of the same setting are never completely identical. The present method recreates these specific dynamics of radar and LIDAR point clouds. The useful application is that downstream processing of the point clouds, using the synthetically generated point clouds, may be checked for whether it manages with the stochastic character of the measurements, or whether, for example, an activation signal that is provided for activating a vehicle likewise stochastically fluctuates.

For radar reflections, the stochastic properties are more physically pronounced than for LIDAR reflections. LIDAR interrogating radiation is short-wave, and therefore may generate comparatively sharp images of the surroundings. In contrast, the wavelength of radar interrogating radiation is much greater. Therefore, the wave properties of this radar interrogating radiation distinctly come to the forefront, so that the measured reflections have largely stochastic properties. Thus, the true image of the surroundings can generally be obtained from radar measurements only by averaging and/or superimposing a plurality of radar measurements.

The stochastic changes of the reflections are too complex to allow them to be mapped with sufficient accuracy by a single distribution function. Therefore, in accordance with an example embodiment of the present invention, multiple distribution functions are used, and are likewise stochastically selected when drawing each new sample. For instance, in a very simple example in which there are three distribution functions $f_1(x)$, $f_2(x)$, and $f_3(x)$ for a variable x, a selection random distribution may establish, for example, that the next sample is drawn with a probability of 25% from the distribution characterized by function $f_1(x)$, with a probability of 50% from the distribution characterized by function $f_2(x)$, and with a probability of 25% from the distribution characterized by function $f_3(x)$.

The synthetic reflections are combined to form the sought point cloud. This may involve, for example, generating a certain number a of synthetic reflections and forming the point cloud as a union set of these reflections. This number a of reflections may be predefined by the user, for example. However, number a of reflections may also be drawn from a random distribution, for example. For example, for a certain radar device it may be measured how many reflections are typically contained in point clouds provided by this radar device. As the result of this measurement, in particular a frequency distribution, for example, may be obtained from which number a of reflections for the synthetic point cloud may then be drawn.

Number a of reflections is thus preferably adapted to the radar device used. This means that, with regard to this radar device, the point cloud should contain neither an unrealistically large nor an unrealistically small number of reflections.

In one particularly advantageous embodiment, at least one distribution function involves a sum of multiple kernels, each of which indicates the probability of a value for a sample as a function of the distance of this value from a predefined reference value. This sum may in particular be parameterized, for example using a number of the kernels as well as associated bandwidths of the distribution functions defined by the kernels. Estimator $f_h(x)$ of a distribution function having such a composition may for example have the form $$f_h(x) = \frac{1}{n}\sum_{i=1}^{n} K_h(x - x_i)$$

(kernel density estimation (KDE)), where $x_1$ is the reference value for variable x, $K_h$ represents the kernels that are parameterized using bandwidth h>0, and n is the number of kernels. The kernels are non-negative functions such as Gaussian kernels, Cauchy kernels, or Picard kernels.

In a further advantageous embodiment of the present invention, in generating a point cloud for point in time t, at least one point cloud that is generated for an earlier point in time t−n, where n>0, is also used. (FIG. 1, 151). This is based on the finding that the point clouds are detected by sensor on a very fast time scale. A completely new point cloud is typically detected every 100 ms. In particular, traffic situations, for example, are essentially static on this time scale. This means that, with the exception of a few very fast-moving objects, all reflecting objects after 100 ms should still be at the same location, and also observed by the sensor essentially from the same perspective.

In a further advantageous embodiment of the present invention, at least one variable of at least one synthetic reflection is ascertained by interpolation and/or by modeling the behavior of the variable as a Gaussian process, based on values of the variable for other synthetic reflections. For example, the location coordinates, for example, of reflections, may be drawn as samples from the distribution functions, while a signal strength, for example, is interpolated. The synthetically generated point cloud may thus be adapted to the physical reality in such a way that, for example, a signal strength, for example, does not abruptly change in a narrowly delimited spatial area.

In one particularly advantageous embodiment of the present invention, at least one starting point cloud of radar or LIDAR reflections is provided which represents the setting to be depicted by the synthetically generated point cloud. This starting point cloud may have been detected by sensor, for example.

Based on predefined metrics, it is determined to what extent the synthetically generated point cloud is in accord with the starting point cloud. Parameters that characterize at least one distribution function and/or at least one selection random distribution are optimized, with the objective that further synthetically generated point clouds according to the predefined metrics are prospectively in better accord with the starting point cloud.

In this way a synthetic point cloud may be generated which semantically refers to the exact same setting as the starting point cloud. This is particularly advantageous for testing the downstream processing chain, for example in a control unit. If the control unit provides, for example, an activation signal from the synthetically generated point cloud that is qualitatively completely different than from the starting point cloud (for example, accelerating instead of braking), the reason is to be found not in a possible change in the setting, but, rather, solely in the processing chain in the control unit.

The parameter optimization is not limited to the above-described combination of the distribution function as the sum of multiple kernels, and instead may operate with arbitrary parameterized approaches for distribution functions and their linkage.

The semantic agreement of the synthetic point cloud with the starting point cloud may also be utilized to increase labeled training material for classifiers. For example, if a starting point cloud is labeled with setpoint associations to form one or multiple classes onto which the starting point cloud ideally is to be mapped by a trainable classifier, a synthetic point cloud that is semantically identical to this starting point cloud may then be labeled with the same setpoint associations. In particular the training of classifiers involves significant effort, not only for physically detecting training data, but primarily for the predominantly manual labeling of these training data with setpoint classifications.

In accordance with an example embodiment of the present invention, the predefined metrics may in particular involve, for example, a distance measure between the synthetically generated point cloud and the starting point cloud. Such a distance measure may be ascertained, for example, from measurements of distances between each point in the starting point cloud on the one hand and a point in the synthetically generated point cloud on the other hand. However, a distance measure may also be ascertained, for example, by condensing the starting point cloud and the synthetically generated point cloud in each case to one or multiple summary (in particular statistical) parameters and comparing these parameters to one another for both point clouds. Examples of distance measures are a Jenson-Shannon distance, a Wasserstein distance (also known as earth mover's distance), and a chamfer distance.

Alternatively or also in combination therewith, the predefined metrics may involve a statistical hypothesis test, for example. It may thus be hypothesized, for example, that the synthetically generated point cloud is in accord with the starting point cloud, and the points from both point clouds may then be examined, using statistical methods, concerning to what extent they support or do not support this hypothesis. Examples of hypothesis tests are the Kolmogorov-Smirnov test and the Fasano-Franceschini test.

As described above, the synthetically generated point clouds are particularly suitable for testing a control logic system for a vehicle. The present invention therefore further relates to a method for checking a control logic system for a vehicle. The control logic system detects a traffic situation based on radar or LIDAR reflections, and processes this traffic situation to form an activation signal for the vehicle.

Within the scope of this method, in accordance with an example embodiment of the present invention, a first activation signal for the vehicle is ascertained using the control logic system, based on a starting point cloud of reflections that represents the traffic situation. The starting point cloud may in particular have been detected by sensor, for example.

As described above, at least one point cloud that semantically refers to the same traffic situation is synthetically generated from the starting point cloud. Based on the synthetically generated point cloud, the control logic system is used to ascertain a second activation signal for the vehicle. Based on a predefined criterion, it is checked to what extent the second activation signal is in accord with the first activation signal.

The criterion may in particular involve, for example, a check as to whether an activation of the vehicle using the second activation signal would have the same qualitative effect as the activation of the vehicle using the first activation signal. For example, if the vehicle were braked or accelerated according to both activation signals, within certain limits it is to be expected that the two activation signals would effectuate a braking or acceleration with different intensities. However, if for example the first activation signal were to effectuate a braking and the second activation signal instead were to effectuate an acceleration or a steering movement, these two activation signals may no longer be regarded as being in accord with one another.

The check does not necessarily have to take place solely during the development of a control unit, prior to installation in a vehicle. Rather, this check may also be continued as online control during ongoing operation of the vehicle. If in each case the activation signal formed from the presently measured point cloud and the activation signal formed from the synthetically generated point cloud are in accord with one another in all driving situations, this is an indicator that the control unit is operating properly. In contrast, if a deviation between the two activation signals suddenly arises in a certain traffic situation, this is an indicator that the control unit possibly is not handling this situation.

Thus, in a further advantageous embodiment of the present invention, in response to the second activation signal being in accord with the first activation signal, the vehicle is activated using the first activation signal. In contrast, if the second activation signal is not in accord with the first activation signal, further arbitrary suitable measures may be taken. For example, a further sensor for assessing the traffic situation may be switched on, or a driver of a semi-automatedly driving vehicle may be prompted to take control.

As described above, synthetically generated point clouds may also be used as additional training data for a classifier network. Therefore, the present invention further relates to a method for training a classifier network, which is designed to map point clouds of radar or LIDAR reflections, which represent traffic situations, onto associations with one or multiple classes of a predefined classification.

Within the scope of this method, in accordance with an example embodiment of the present invention, training point clouds as well as setpoint associations, onto which the classifier network is ideally to map these training point clouds, are provided. The classes in the associations may refer, for example, to recognized objects (such as traffic signs or other road users), but also, for example, to the situation as a whole (for example, "host vehicle is in need of maintenance" or "hazardous situation").

By use of the method described above, at least one point cloud that semantically refers to the same traffic situation is synthetically generated from at least one training point cloud. The synthetically generated point cloud is added to the training point clouds. In the process, the setpoint association of that training point cloud from which the synthetically generated point cloud has been generated is assigned to the latter.

The training point clouds are mapped by the classifier network onto associations with one or multiple classes. A deviation of these associations from the respective setpoint associations is assessed based on a predefined cost function. Parameters that characterize the behavior of the classifier network are optimized, with the objective that the further processing of training point clouds prospectively results in a better assessment by the cost function.

In the context of this method, as the result of the synthetic generation of point clouds, for the same effort for physical collection and for manual labeling of training point clouds, as a whole more training point clouds having a greater variability are available. The capability of the classifier network for generalization is thus enhanced. Thus, if the classifier network during subsequent active operation processes a point cloud which thus far was unseen in the training, the probability is increased that the ascertained class association, and thus also an action that is triggered within the scope of the downstream processing, is appropriate for the particular traffic situation.

The method may in particular be implemented completely or partially by computer. Therefore, the present invention further relates to a computer program that includes machine-readable instructions which, when executed on one or multiple computers, prompt the computer(s) to carry out one of the described methods. In this sense, control units for vehicles and embedded systems for technical devices which are likewise capable of executing machine-readable instructions are also to be regarded as computers.

Moreover, the present invention further relates to a machine-readable data medium and/or a download product that includes the computer program. A download product is a digital product that is transferable via a data network, i.e., downloadable by a user of the data network, and that may be offered for sale in an online store, for example, for immediate download.

In addition, a computer may be equipped with the computer program, the machine-readable data medium, or the download product.

Further measures that enhance the present invention are described in greater detail below with reference to figures, together with the description of the preferred exemplary embodiments of the present invention.

DETAILED DESCRIPTION OF EXAMPLE EMBODIMENTS

Figure 1:
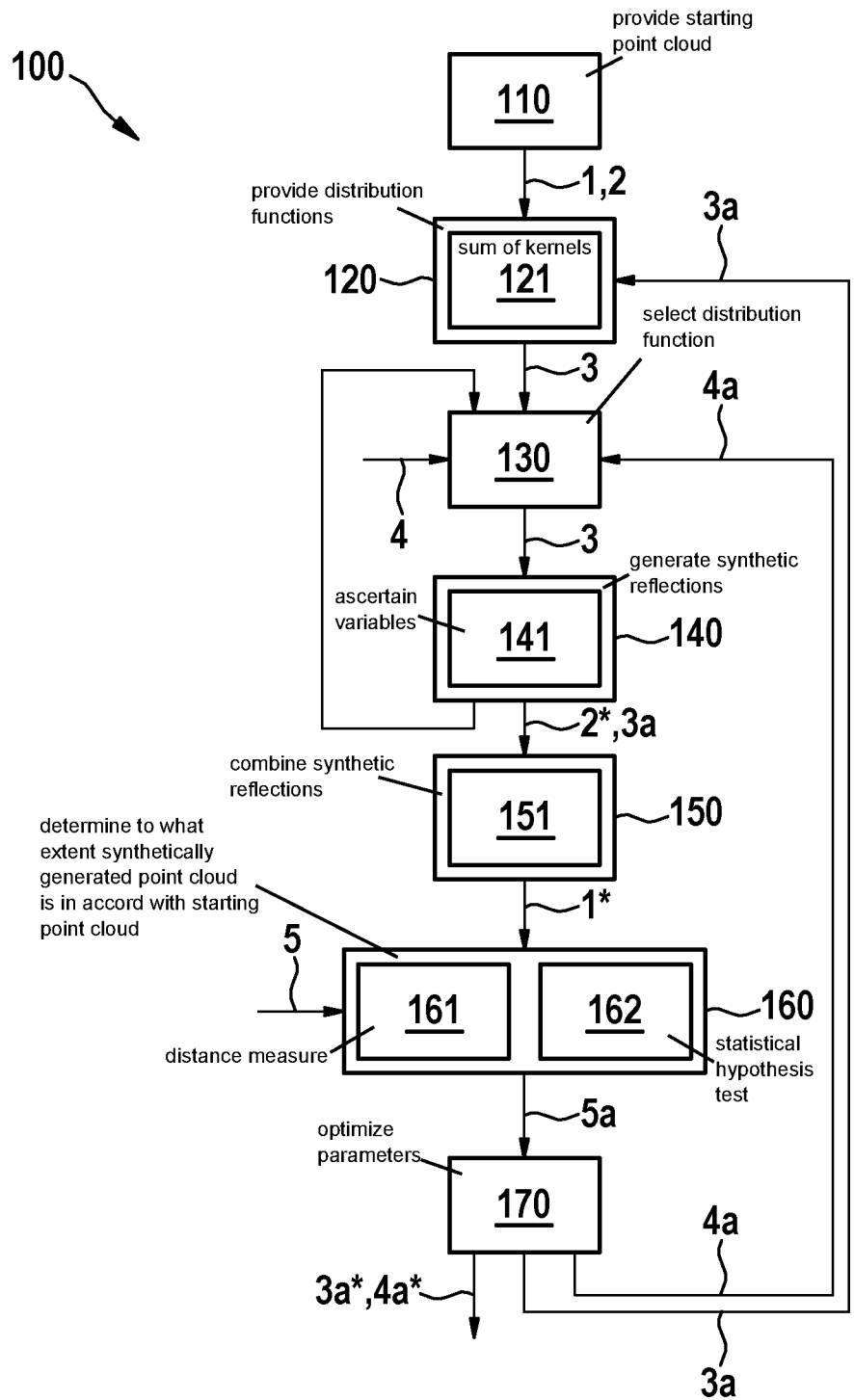
FIG. 1 shows one exemplary embodiment of method 100 for synthetically generating a point cloud 1*, in accordance with the present invention.

FIG. 1 is a schematic flowchart of one exemplary embodiment of method 100 for synthetically generating a point cloud 1* of radar or LIDAR reflections 2.

A starting point cloud 1 of radar or LIDAR reflections 2 is provided in step 110. This starting point cloud 1 represents the setting that is to be depicted by synthetically generated point cloud 1*.

Distribution functions 3 are provided in step 120. These distribution functions 3 according to block 121 may in particular involve, for example, a sum of multiple kernels, each of which indicates the probability of a value for a drawn sample 3* as a function of the distance of this value from a predefined reference value.

In preparation for drawing a sample 3* from a distribution function 3, initially one of multiple distribution functions 3 is selected in step 130 according to at least one selection random distribution 4. Synthetic reflections 2* are then generated in step 140 in that, for variables contained in radar or LIDAR reflections, a sample 3* is drawn in each case from distribution function 3 that has just been selected. Before next sample 3* is drawn, a distribution function 3 is selected anew according to step 130. According to block 141, variables of synthetic reflections 2* may be ascertained by interpolation and/or by modeling the behavior of the variables as a Gaussian process, based on values of the particular variable for other synthetic reflections 2*.

Synthetic reflections 2* for sought point cloud 1* are combined in step 150. It is determined in step 160, based on predefined metrics 5, to what extent synthetically generated point cloud 1* is in accord with starting point cloud 1. Predefined metrics 5 according to block 161 may involve a distance measure between synthetically generated point cloud 1* and starting point cloud 1. According to block 162, predefined metrics 5 may involve a statistical hypothesis test. The assessment by metrics 5 is denoted by reference numeral 5a.

Parameters 3a, 4a, which characterize at least one distribution function 3 and/or at least one selection random distribution 4, are optimized in step 170, with the objective that further synthetically generated point clouds 1* according to predefined metrics 5 are prospectively in better accord with starting point cloud 1. The completely optimized state of parameters 3a, 4a is denoted by reference numerals 3a* and 4a*, respectively. From this point on, new synthetic point clouds 1* that are in accord with same starting point cloud 1 may be generated using these parameters 3a* and 4a*.

Figure 2A:
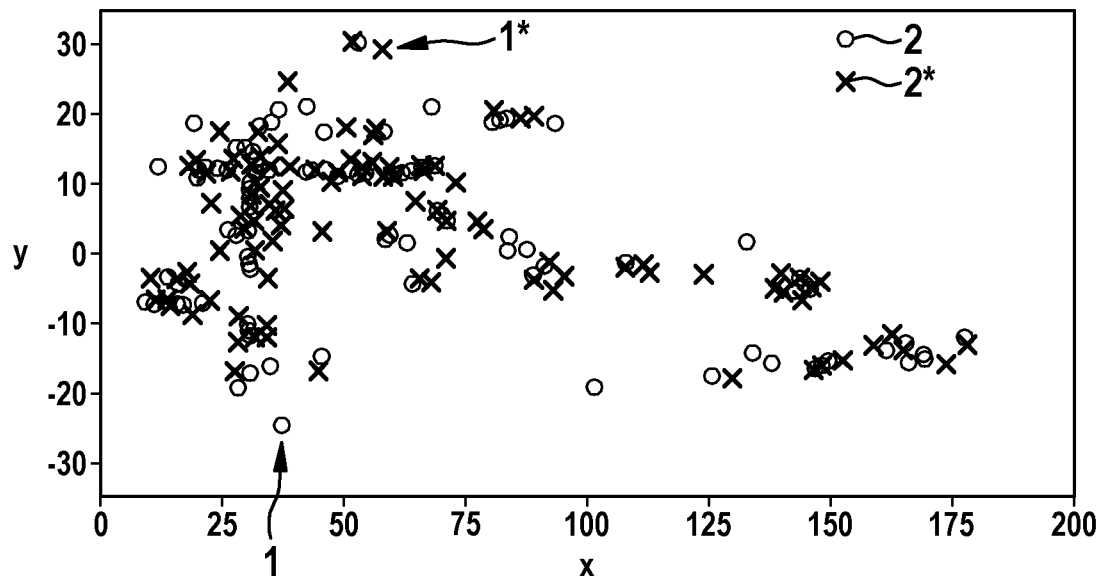
FIGS. 2A and 2B show an example of adapting synthetic point clouds 1* to starting point clouds 1 for kernels having a large bandwidth (FIG. 2A) and for kernels having a small bandwidth (FIG. 2B), in accordance with an example embodiment of the present invention.
Figure 2B:
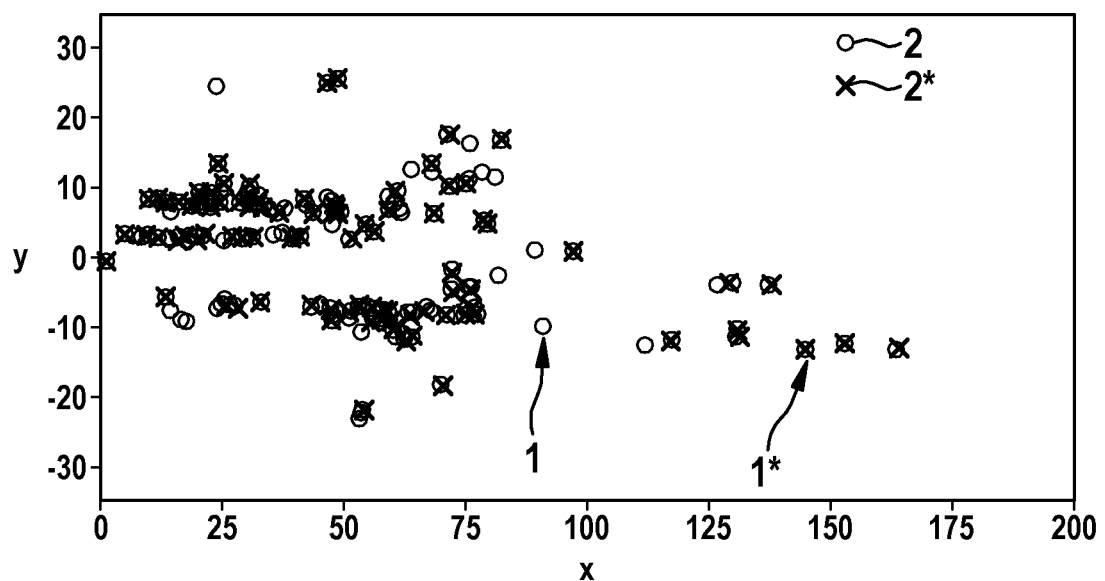

FIGS. 2A and 2B show two examples of how synthetically generated point cloud 1* is adapted to a starting point cloud 1. In a first example in FIG. 2A, selected distribution functions 3 contain fewer kernels, but these kernels in each case have larger bandwidths, which correspondingly allow more deviations from starting point cloud 1. In a second example in FIG. 2B, selected distribution functions 3 contain more kernels, which have narrower bandwidths and correspondingly allow smaller deviations from starting point cloud 1.

Figure 3:
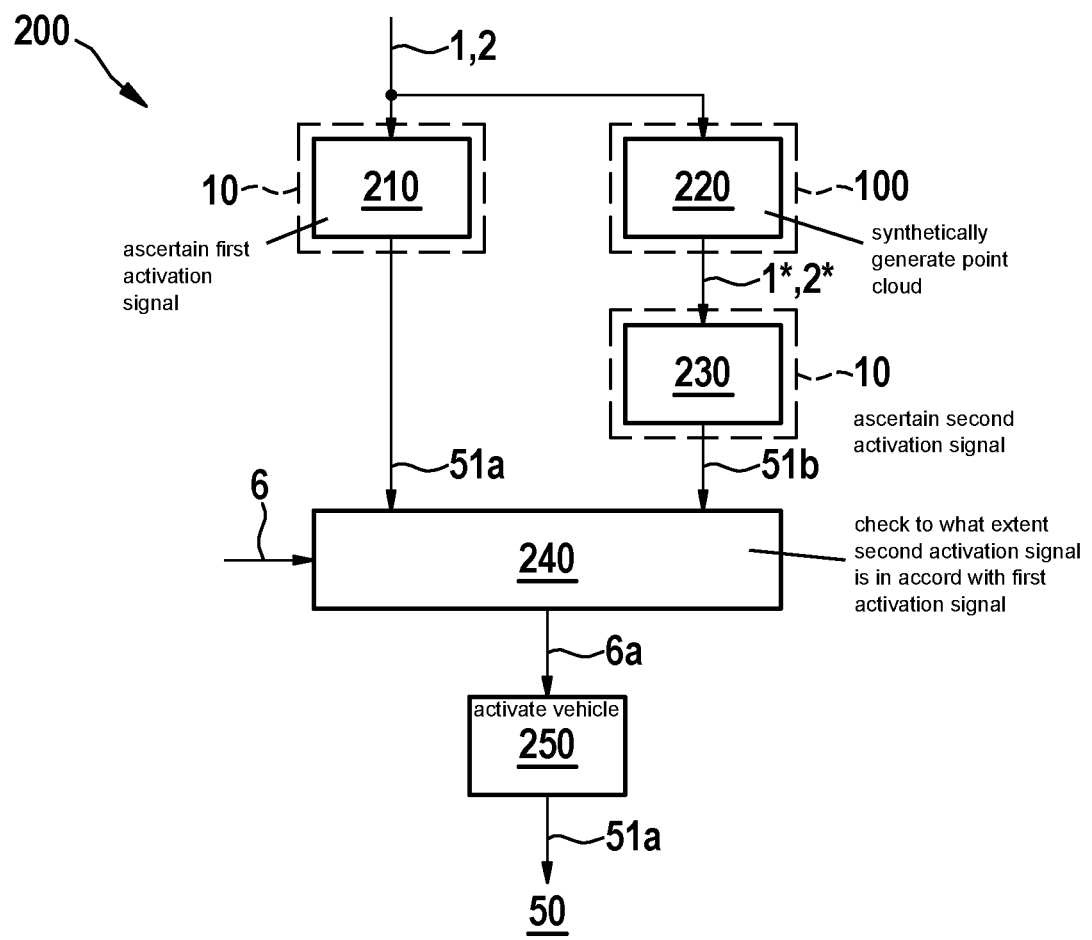
FIG. 3 shows one exemplary embodiment of method 200 for checking a control logic system 10 for a vehicle 50, in accordance with an example embodiment of the present invention.

FIG. 3 shows one exemplary embodiment of method 200 for checking a control logic system 10 for a vehicle 50.

Control logic system 10 ascertains in step 210 a first activation signal 51a for vehicle 50, based on a starting point cloud 1 of reflections 2 that represent a traffic situation.

At least one point cloud 1* that semantically refers to the same traffic situation is synthetically generated from starting point cloud 1 in step 220, using method 100 described above. Based on this synthetically generated point cloud, a second activation signal 51b for the vehicle is ascertained in step 230, using control logic system 10.

Based on a predefined criterion 6, it is checked in step 240 as to what extent second activation signal 51b is in accord with first activation signal 51a. The result of this check or assessment is denoted by reference numeral 6a. In response to second activation signal 51b being sufficiently in accord with first activation signal 51a, vehicle 50 is activated in step 250 using first activation signal 51a.

Figure 4:
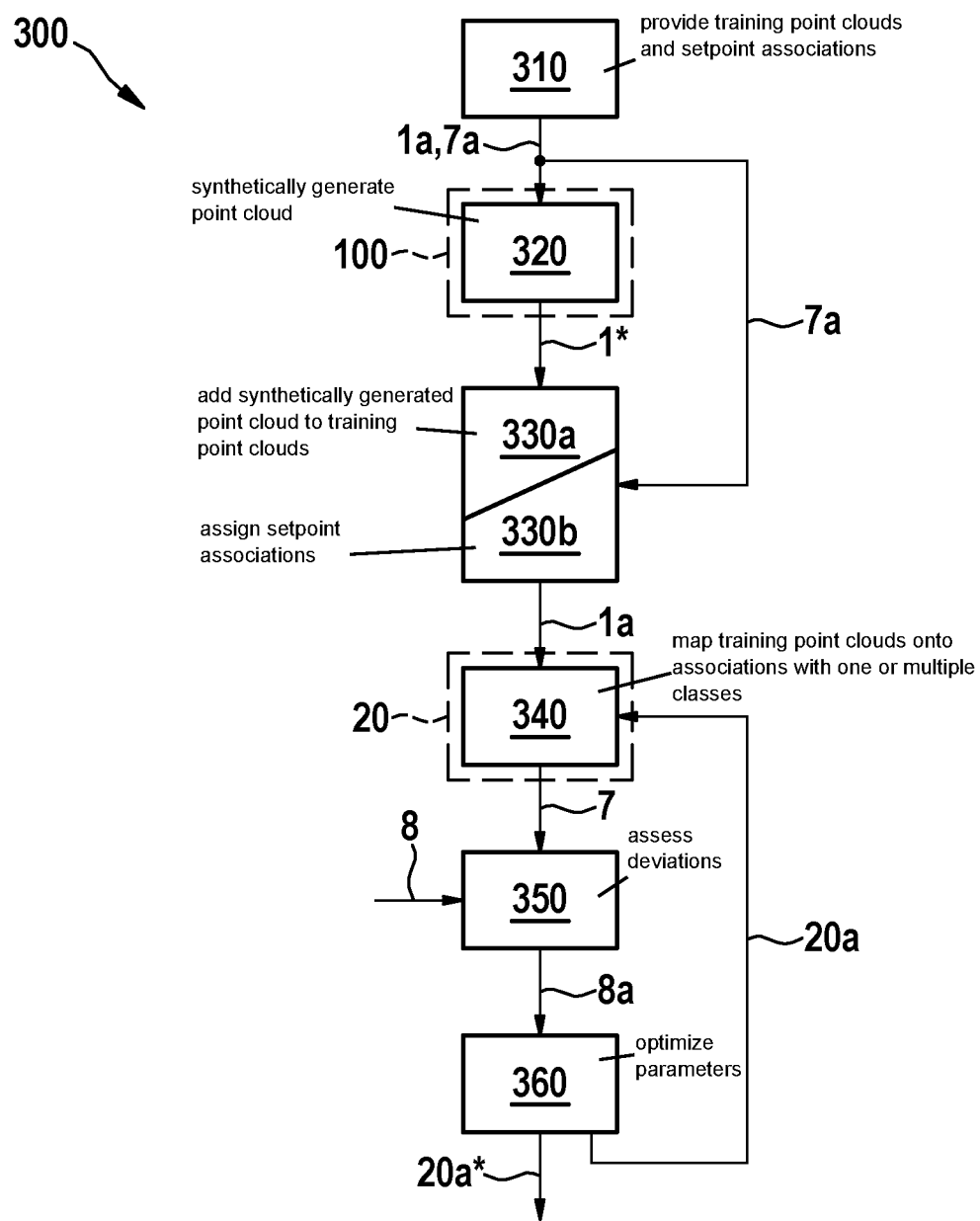
FIG. 4 shows one exemplary embodiment of method 300 for training a classifier network 20, in accordance with the present invention.

FIG. 4 shows one exemplary embodiment of method 300 for training a classifier network 20. This classifier network 20 is designed to map point clouds 1 of radar or LIDAR reflections 2, which represent traffic situations, onto associations 7 with one or multiple classes of a predefined classification.

Training point clouds 1a and setpoint associations 7a, onto which classifier network 20 is ideally to map these training point clouds 1, are provided in step 310. At least one point cloud 1* that semantically refers to the same traffic situation is synthetically generated from at least one training point cloud 1a in step 320, using method 100 described above. Synthetically generated point cloud 1* is added to training point clouds 1a in step 330a, setpoint association 7a of that training point cloud 1a from which the synthetically generated point cloud has been generated being assigned to the latter in step 330b.

Training point clouds 1a are mapped by classifier network 20 onto associations 7 with one or multiple classes in step 340. A deviation of these associations 7 from respective setpoint associations 7a is assessed in step 350 based on a predefined cost function 8. Parameters 20a that characterize the behavior of classifier network 20 are optimized in step 360, with the objective that the further processing of training point clouds 1a prospectively results in a better assessment 8a by cost function 8. The completely trained state of parameters 20a is denoted by reference numeral 20a*.

What is claimed is:

1. A method for synthetically generating a point cloud of radar or LIDAR reflections, each reflection indicating at least one location at which radar or LIDAR interrogating radiation has been reflected, the method comprising the following steps:
   providing distribution functions which each, according to a random distribution, provide samples for at least one of a plurality of variables contained in the radar or LIDAR reflections;
   generating synthetic reflections by drawing samples in each case from the distribution functions for the variables contained in the radar or LIDAR reflections, and selecting one of the distribution functions according to at least one selection random distribution to draw each sample;
   combining the synthetic reflections to form a sought synthetic point cloud.

2. The method as recited in claim 1, wherein at least one of the distribution function involves a sum of multiple kernels, each of the multiple kernels indicating a probability of a value for a sample as a function of a distance of the value from a predefined reference value.

3. The method as recited in claim 2, wherein the sum is parameterized using a number of the kernels and associated bandwidths of the distribution functions defined by the kernels.

4. The method as recited in claim 1, wherein, in generating a synthetic point cloud for a point in time t, at least one point cloud that is generated for an earlier point in time t−n, where n>0, is also used.

5. The method as recited in claim 1, wherein at least one variable of at least one synthetic reflection is ascertained by interpolation and/or by modeling a behavior of the at least one variable as a Gaussian process, based on values of the at least one variable for other synthetic reflections.

6. The method as recited in claim 1, wherein:
   at least one starting point cloud of radar or LIDAR reflections a that represents a setting to be depicted by the synthetically generated point cloud is provided;

based on predefined metrics, it is determined to what extent the synthetically generated point cloud is in accord with the starting point cloud, and parameters that characterize at least one distribution function and/or at least one selection random distribution are optimized, with an objective that further synthetically generated point clouds according to the predefined metrics are prospectively in better accord with the starting point cloud.

7. The method as recited in claim 6, wherein the predefined metrics include a distance measure between the synthetically generated point cloud and the starting point cloud.

8. The method as recited in claim 6, wherein the predefined metrics include a statistical hypothesis test.

9. A method for checking a control logic system for a vehicle, the control logic system configured to detect a traffic situation based on radar or LIDAR reflections and process the traffic situation to form an activation signal for the vehicle, the method comprising the following steps:

based on a starting point cloud of reflections that represents the traffic situation, ascertaining a first activation signal for the vehicle), using the control logic system;

synthetically generating at least one point cloud that semantically refers to the same traffic situation is from the starting point cloud, the at least one point cloud being synthetically generating by:

providing distribution functions which each, according to a random distribution, provide samples for at least one of a plurality of variables contained in the radar or LIDAR reflections;

generating synthetic reflections by drawing samples in each case from the distribution functions for the variables contained in the radar or LIDAR reflections, and selecting one of the distribution functions according to at least one selection random distribution to draw each sample;

combining the synthetic reflections to form a sought synthetic point cloud;

wherein:

at least one starting point cloud of radar or LIDAR reflections a that represents a setting to be depicted by the synthetically generated point cloud is provided;

based on predefined metrics, it is determined to what extent the synthetically generated point cloud is in accord with the starting point cloud, and parameters that characterize at least one distribution function and/or at least one selection random distribution are optimized, with an objective that further synthetically generated point clouds according to the predefined metrics are prospectively in better accord with the starting point cloud;

ascertaining a second activation signal for the vehicle based on the synthetically generated point cloud, using the control logic system;

based on a predefined criterion, checking to what extent the second activation signal is in accord with the first activation signal.

10. The method as recited in claim 9, wherein, in response to the second activation signal being in accord with the first activation signal, the vehicle is activated using the first activation signal.

11. A method for training a classifier network, which is configured to map point clouds of radar or LIDAR reflections, which represent traffic situations, onto associations with one or multiple classes of a predefined classification, the method comprising:

providing training point clouds and setpoint associations onto which the classifier network is ideally to map the training point clouds;

synthetically generating at least one point cloud that semantically refers to the same traffic situation from at least one training point cloud, the at least one point cloud being synthetically generating by:

providing distribution functions which each, according to a random distribution, provide samples for at least one of a plurality of variables contained in the radar or LIDAR reflections;

generating synthetic reflections by drawing samples in each case from the distribution functions for the variables contained in the radar or LIDAR reflections, and selecting one of the distribution functions according to at least one selection random distribution to draw each sample;

combining the synthetic reflections to form a sought synthetic point cloud;

wherein:

at least one starting point cloud of radar or LIDAR reflections a that represents a setting to be depicted by the synthetically generated point cloud is provided;

based on predefined metrics, it is determined to what extent the synthetically generated point cloud is in accord with the starting point cloud, and parameters that characterize at least one distribution function and/or at least one selection random distribution are optimized, with an objective that further synthetically generated point clouds according to the predefined metrics are prospectively in better accord with the starting point cloud;

adding the synthetically generated point cloud to the training point clouds, a setpoint association of the training point cloud from which the synthetically generated point cloud has been generated being assigned to the synthetically generated point cloud;

mapping the training point clouds by the classifier network onto associations with one or multiple classes;

assessing a deviation of the associations from the respective setpoint associations based on a predefined cost function;

optimizing parameters that characterize a behavior of the classifier network, with an objective that further processing of the training point clouds prospectively results in a better assessment by the cost function.

12. A non-transitory machine-readable data medium on which is stored a computer program for synthetically generating a point cloud of radar or LIDAR reflections, each reflection indicating at least one location at which radar or LIDAR interrogating radiation has been reflected, the computer program, when executed by one or more computers, causing the one or more computers to perform the following steps:

providing distribution functions which each, according to a random distribution, provide samples for at least one of a plurality of variables contained in the radar or LIDAR reflections;

generating synthetic reflections by drawing samples in each case from the distribution functions for the variables contained in the radar or LIDAR reflections, and selecting one of the distribution functions according to at least one selection random distribution to draw each sample;

combining the synthetic reflections to form a sought synthetic point cloud.

13. A computer configured to synthetically generating a point cloud of radar or LIDAR reflections, each reflection indicating at least one location at which radar or LIDAR interrogating radiation has been reflected, the computer configured to:

provide distribution functions which each, according to a random distribution, provide samples for at least one of a plurality of variables contained in the radar or LIDAR reflections;

generate synthetic reflections by drawing samples in each case from the distribution functions for the variables contained in the radar or LIDAR reflections, and selecting one of the distribution functions according to at least one selection random distribution to draw each sample;

combine the synthetic reflections to form a sought synthetic point cloud.

\* \* \* \* \*